US010642397B2

(12) United States Patent
Li (10) Patent No.: US 10,642,397 B2
(45) Date of Patent: May 5, 2020

(54) SIGNAL TRANSMITTING METHOD, STYLUS, SIGNAL RECEIVING METHOD AND TOUCH SCREEN (71) Applicant: SHENZHEN GOODIX TECHNOLOGY CO., LTD., Shenzhen (CN)

(72) Inventor: Hai Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/175,974

(22) Filed: Oct. 31, 2018

(65) Prior Publication Data
US 2019/0196631 A1 Jun. 27, 2019

Related U.S. Application Data (63) Continuation of application No. PCT/CN2017/119012, filed on Dec. 27, 2017.

(51) Int. Cl.
G06F 3/041 (2006.01)
G06F 3/0354 (2013.01)
(Continued)

(52) U.S. Cl.
CPC ............ G06F 3/0412 (2013.01); G06F 3/038 (2013.01); G06F 3/03545 (2013.01);
(Continued)

(58) Field of Classification Search
None
See application file for complete search history.

(56) References Cited

U.S. PATENT DOCUMENTS

2015/0358481 A1   12/2015  Nagata et al.
2017/0192591 A1*  7/2017   Jang .................... G06F 3/03545
2017/0322646 A1   11/2017  Gur et al.

FOREIGN PATENT DOCUMENTS

CN     102902383 A    1/2013
CN     106954266 A    7/2017
(Continued)

OTHER PUBLICATIONS

Extended European Search Report for European Application No. 17906782.2 dated Jun. 25, 2019.

Primary Examiner — Kenneth B Lee, Jr.
(74) Attorney, Agent, or Firm — Heslin Rothenberg Farley & Mesiti P.C.

(57) ABSTRACT

A signal transmitting method includes: performing amplitude modulation respectively on n binary codes that represent information to be transmitted so as to obtain n coded amplitude modulation signals sequentially arranged, wherein n is an integer greater than 1; and continuously transmitting the n coded amplitude modulation signals which are sequentially arranged. The coded amplitude modulation signals, sequence numbers of which are odd, are transmitted at a preset first frequency, and the coded amplitude modulation signals, sequence numbers of which are even, are transmitted at a preset second frequency, whereby fault-tolerant time between coded amplitude modulation signals is saved, transmission time of the same number of coded amplitude modulation signals is reduced, and time required by a screen for completing detection on the coded amplitude modulation signals is reduced, thereby promoting a report rate and improving the anti-interference ability of the screen.

13 Claims, 3 Drawing Sheets (51) Int. Cl.
    *G06F 3/044*          (2006.01)
    *G06F 3/038*          (2013.01)
    *H04L 27/04*          (2006.01)
    *H04L 27/06*          (2006.01)

(52) U.S. Cl.
    CPC .............. *G06F 3/044* (2013.01); *H04L 27/04* (2013.01); *H04L 27/06* (2013.01)

(56) References Cited

FOREIGN PATENT DOCUMENTS

| | | |
|---|---|---|
| CN | 107077241 A | 8/2017 |
| EP | 3477439 A1 | 5/2019 |

\* cited by examiner

SIGNAL TRANSMITTING METHOD, STYLUS, SIGNAL RECEIVING METHOD AND TOUCH SCREEN

CROSS-REFERENCE TO RELATED APPLICATIONS

The present disclosure is a continuation of international application no. PCT/CN2017/119012 filed on Dec. 27, 2017, which application is hereby incorporated by reference herein, in its entirety.

TECHNICAL FIELD

The present disclosure relates to signal processing technologies, and more particularly to a signal transmitting method, a stylus, a signal receiving method and a touch screen.

BACKGROUND

With the popularization of a capacitive touch screen, the application of a capacitive stylus also becomes wider and wider. When a user uses the capacitive stylus, the capacitive touch screen performs time-sharing detection on a coding signal of the touch screen and a coding signal of the stylus. In this case, screen detection time of the capacitive touch screen is a key factor which affects a report rate of the stylus, and the higher the report rate is, the faster a touch screen responds to the writing of the stylus. As the user's demands for writing experience and touch experience of the stylus increase, the requirement for the report rate of the stylus is also becoming higher and higher.

Figure 1:
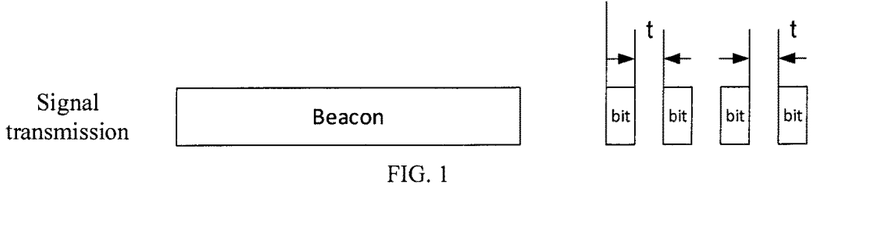
FIG. 1 is a schematic diagram of signal transmission of a stylus in the existing technology.

Inventor(s) find that the existing technology at least has the following problems that: in an existing coding mode, with reference to FIG. 1, when the stylus transmits signals, there is a problem of synchronization between a stylus and a touch screen. In order to ensure that signals of bits detected at the touch screen cannot be mutually affected, a fault-tolerant time t is required to be reserved between a bit and a next bit, resulting in that the stylus takes a relatively long portion of the screen detection time of the touch screen, the report rate of the stylus is affected, and the touch screen has a relatively weak anti-interference ability.

SUMMARY

According to some embodiments of the present disclosure, a signal transmitting method, a stylus, a signal receiving method and a touch screen are provided. n coded amplitude modulation signals are transmitted continuously and alternatively at a first frequency and a second frequency, so that fault-tolerant time between coded amplitude modulation signals is saved, transmission time of the same number of coded amplitude modulation signals is reduced, and correspondingly, time required by a touch screen for completing detection on the coded amplitude modulation signals is reduced, thereby promoting a report rate and improving the anti-interference ability of the touch screen.

An embodiment of the present disclosure provides a signal transmitting method applied to a stylus. The method includes respectively performing amplitude modulation on n binary codes that represent information to be transmitted so as to obtain n coded amplitude modulation signals which are sequentially arranged. Here, n is an integer greater than 1. The method further includes continuously transmitting the n coded amplitude modulation signals which are sequentially arranged. Here, the coded amplitude modulation signals, sequence numbers of which are odd, are transmitted at a preset first frequency, and the coded amplitude modulation signals, sequence numbers of which are even, are transmitted at a preset second frequency.

An embodiment of the present disclosure further provides a signal receiving method applied to a touch screen. The method includes continuously detecting n coded amplitude modulation signals which are continuously transmitted by a stylus, by utilizing n+1 detection time slices. In the n coded amplitude modulation signals, the coded amplitude modulation signals, sequence numbers of which are odd, have a preset first frequency, the coded amplitude modulation signals, sequence numbers of which are even, have a preset second frequency. Signals detected within an $i^{th}$ detection time slice and a $(i+1)^{th}$ detection time slice include a complete $i^{th}$ coded amplitude modulation signal, and i=1, 2, 3 . . . n. The method further includes calculating signal strength of the n coded amplitude modulation signals according to the signals detected within the n+1 detection time slices, and respectively binarizing the signal strength of the n coded amplitude modulation signals so as to obtain n binary codes that represent information to be transmitted.

An embodiment of the present disclosure further provides a stylus. The stylus includes at least one processor and a storage in communication connection with the at least one processor. The storage stores instructions which can be executed by the at least one processor, and the instructions are executed by the at least one processor, so that the at least one processor implements the above-mentioned signal transmitting method.

An embodiment of the present disclosure further provides a touch screen. The touch screen includes at least one processor and a storage in communication connection with the at least one processor. The storage stores instructions which can be executed by the at least one processor, and the instructions are executed by the at least one processor, so that the at least one processor implements the above-mentioned signal receiving method.

Compared to the existing technology, in the embodiments of the present disclosure, the stylus respectively performs amplitude modulation on n binary codes that represent the information to be transmitted and transmits the n coded amplitude modulation signals continuously and alternatively at the first frequency and the second frequency, so that the fault-tolerant time between coded amplitude modulation signals is saved, the transmission time of the same number of coded amplitude modulation signals is reduced, and correspondingly, the time required by the touch screen for completing detection on the coded amplitude modulation signals is reduced, thereby promoting a report rate and improving the anti-interference ability of the touch screen. Meanwhile, when the touch screen implements detection on all of the coded amplitude modulation signals which are continuously transmitted, one complete coded amplitude modulation signal can still be acquired and distinguished within two adjacent detection time slices, and thus, detection is still accurate.

Furthermore, in the signal transmitting method, both the first frequency and the second frequency are integral multiple of a fundamental frequency, and a modulus of a difference value between the first frequency and the second frequency is greater than or equal to twice of the fundamental frequency. In this embodiment, a specific setting mode of the first frequency and the second frequency is provided, and mutual affection between the first frequency and the second frequency can be avoided.

Furthermore, in the signal transmitting method, time slice lengths of all of the coded amplitude modulation signals are equal. In this embodiment, the time slice lengths of all of the coded amplitude modulation signals are set to be equal, so that the complexity of transmitting the coded amplitude modulation signals can be simplified, and meanwhile, the complexity of screen detection is simplified.

Furthermore, in the signal transmitting method, when the binary code is 0, the coded amplitude modulation signal is 0. In this embodiment, when the binary code is 0, any signal is not sent in this time slice, and a relatively simple processing mode for the signal which corresponds to a binary code of 0 is provided.

Furthermore, in the signal transmitting method, the information to be transmitted includes a nib pressure of the stylus or a pressing signal of a functional key of the stylus. This embodiment provides specific contents of the information to be transmitted.

Furthermore, in the signal receiving method, a time slice length of the $i^{th}$ detection time slice is equal to that of an $i^{th}$ coded amplitude modulation signal, and a time slice length of a $(n+1)^{th}$ detection time slice is equal to one of time slice lengths of the first n detection time slices. In this embodiment, a specific setting mode of the time slice lengths of n+1 detection time slices is provided.

Furthermore, in the signal receiving method, the time slice length of the $(n+1)^{th}$ detection time slice is equal to a minimum time slice length in the time slice lengths of the first n detection time slices. In this embodiment, detection time of the touch screen can be further saved.

Furthermore, in the signal receiving method, the time slice lengths of all of the coded amplitude modulation signals are equal. In this embodiment, the complexity of transmitting the coded amplitude modulation signals can be simplified, and meanwhile, the complexity of screen detection is simplified.

Furthermore, in the signal receiving method, signal strength $Bit_i$ of the $i^{th}$ coded amplitude modulation signal is that: when i is an odd number, $Bit_i = R_{i\_f1} + R_{i+1\_f1}$; and when i is an even number, $Bit_i = R_{i\_f2} + R_{i+1\_f2}$. Here, $R_{i\_f1}$ represents the signal strength of the coded amplitude modulation signal with the first frequency within the $i^{th}$ detection time slice, $R_{i\_f2}$ represents the signal strength of the coded amplitude modulation signal with the second frequency within the $i^{th}$ detection time slice, $R_{i+1\_f1}$ represents the signal strength of the coded amplitude modulation signal with the first frequency within the $(i+1)^{th}$ detection time slice, and $R_{i+1\_f2}$ represents the signal strength of the coded amplitude modulation signal with the second frequency within the $(i+1)^{th}$ detection time slice. This embodiment provides a specific calculation formula for the signal strength of the coded amplitude modulation signal.

BRIEF DESCRIPTION OF THE DRAWINGS

One or more embodiments are exemplarily illustrated by figures in the corresponding accompanying drawings, those exemplary illustrations do not constitute a limitation to the embodiments, elements with the same reference numbers in the accompanying drawings represent similar elements, and unless specified declaration, otherwise the figures in the accompanying drawings do not constitute a limitation to proportion.

DETAILED DESCRIPTION

In order to make objectives, technical solutions and advantages of the present disclosure clearer, some of the embodiments of the present disclosure will be further illustrated in detail with reference to the accompanying drawings and the embodiments. It should be understood that specific embodiments described herein merely are used for explaining the present disclosure, and are not intended to limit the present disclosure.

A first embodiment of the present disclosure relates to a signal transmitting method which is applied to a stylus. The signal transmitting method includes: respectively performing amplitude modulation on n binary codes that represent information to be transmitted, so as to obtain n coded amplitude modulation signals sequentially arranged, n being an integer greater than 1; and continuously transmitting the n coded amplitude modulation signals which are sequentially arranged. Here, the coded amplitude modulation signals, sequence numbers of which are odd, are transmitted at a preset first frequency, and the coded amplitude modulation signals, sequence numbers of which are even, are transmitted at a preset second frequency.

Compared to the existing technology, in this embodiment, the stylus respectively performs amplitude modulation on the n binary codes that represent the information to be transmitted, and the n coded amplitude modulation signals are transmitted alternatively at the first frequency and the second frequency, so that fault-tolerant time between coded amplitude modulation signals is saved, transmission time of the same number of coded amplitude modulation signals is reduced, and correspondingly, time required by a screen for completing detection on the coded amplitude modulation signals is reduced, thereby promoting a report rate and improving the anti-interference ability of a screen. Meanwhile, when a touch screen performs detection on all of the coded amplitude modulation signals which are continuously transmitted, one complete coded amplitude modulation signal can still be acquired and distinguished within two adjacent detection time slices, and thus, detection is still accurate.

Implementation details of the signal transmitting method in this embodiment will be specifically illustrated below, and contents hereinafter merely are implementation details that are provided for convenience of understanding and are not necessary for implementing the technical solution.

Figure 2:
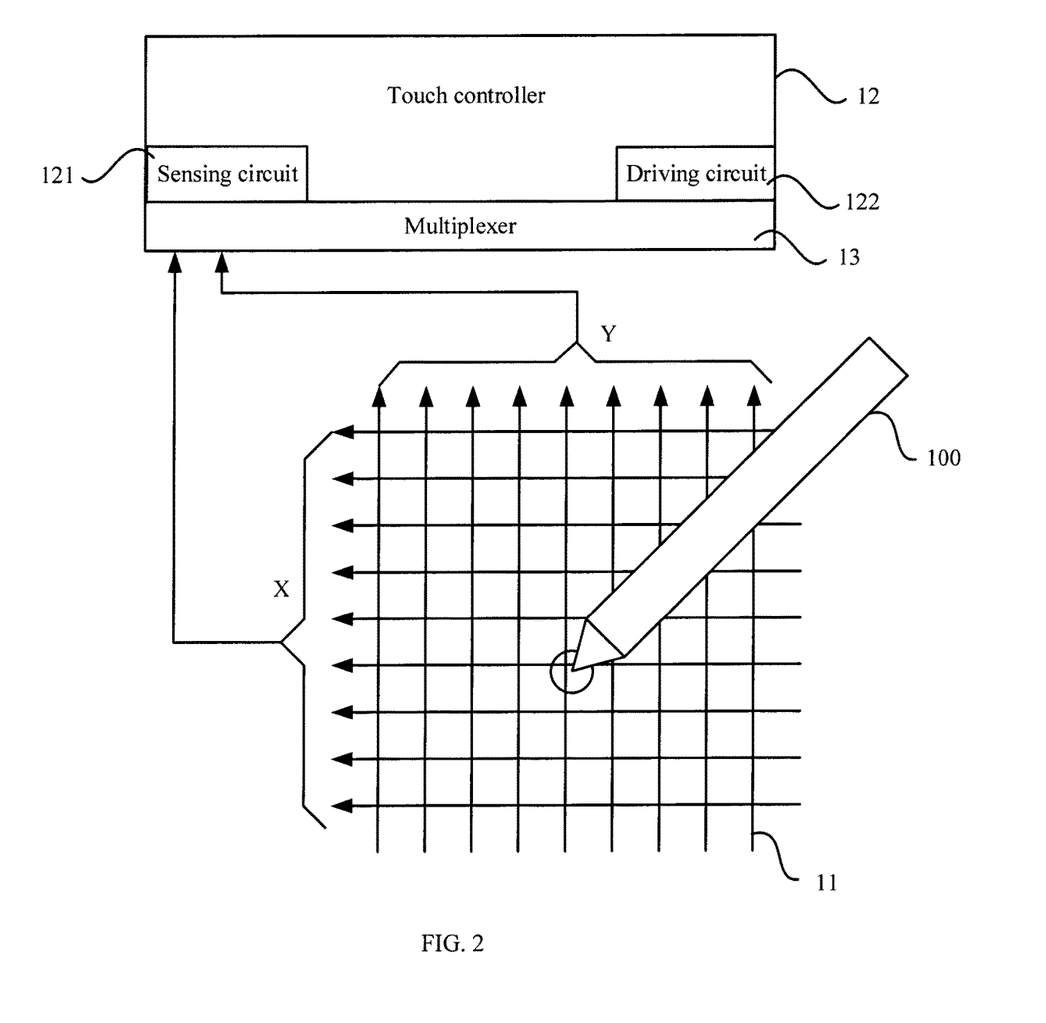
FIG. 2 is a structural schematic diagram of communication between a stylus and a touch screen according to a first embodiment of the present disclosure.

The signal transmitting method in this embodiment is applied to the stylus, the stylus is used for communicating with the touch screen, and FIG. 2 is a schematic diagram of communication between the stylus and the touch screen. Herein the stylus may be a capacitive stylus.

Firstly, a communication mode of the stylus and the touch screen is illustrated below.

The touch screen includes a sensing layer 11, a touch controller 12 and a multiplexer 13. The sensing layer 11 includes a driving channel Y and a sensing channel X. The driving channel Y and the sensing channel X are connected to the touch controller 12 via the multiplexer 13, and the touch controller 12 further includes a sensing circuit 121 and a driving circuit 122. In a screen detection timing of the touch screen, in one period T, the screen sequentially completes the detection as follows: detecting mutual capacitance, detecting noise, and detecting signal of the stylus. The number of times of the period T for which the screen executes in unit time is a report rate of the screen.

In a stage of detecting the signal of the stylus, the touch controller 12 controls both the driving channel Y and the sensing channel X to be connected to the sensing circuit 121 via the multiplexer 13. When a nib of the stylus 100 sends a signal to the touch screen, coupling capacitance exists between the stylus 100 and the driving channel Y as well as the sensing channel X. The signal is coupled to the driving channel Y as well as the sensing channel X via the coupling capacitance, then the sensing circuit 121 detects the signal. During the detection process, the touch screen only receives signals and does not send out signals. Herein the signals sent by the nib of the stylus 100 may be a square wave, a sine wave or a triangular wave and the like.

Figure 3:
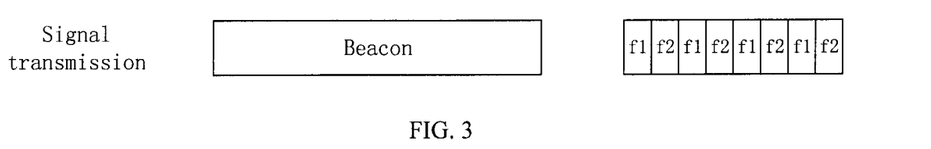
FIG. 3 is a schematic diagram of signal transmission of the stylus according to the first embodiment of the present disclosure.

FIG. 3 is a schematic diagram of signal transmission of the stylus and screen detection. Signal transmission of the stylus 100 includes two stages: a first stage in which the nib transmits a beacon signal for implementing timing synchronization with the touch screen; and a second stage in which the nib continuously transmits n binary codes that represent the information to be transmitted.

Figure 4:
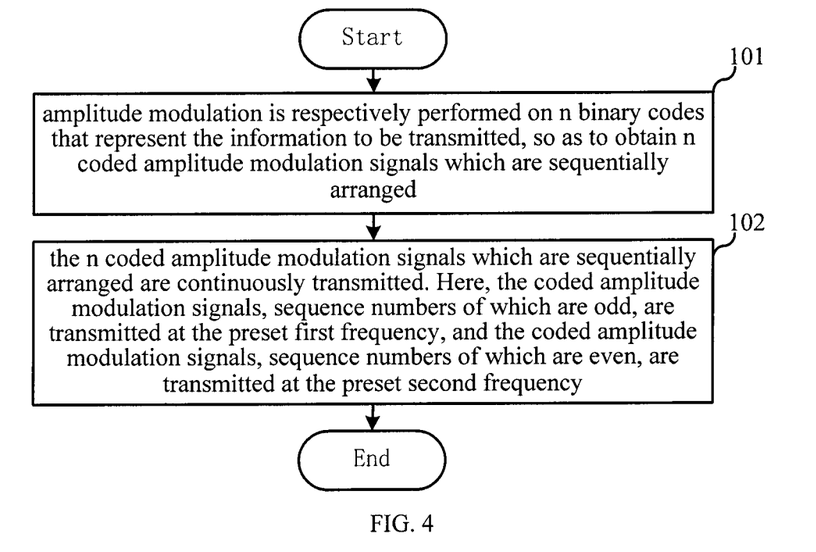
FIG. 4 is a specific flow chart of a signal transmitting method according to the first embodiment of the present disclosure.

A specific flow chart of the signal transmitting method in this embodiment is shown in FIG. 4, in which the first stage of signal transmission of the stylus 100 is the same as that in the existing technology and in the first stage, the beacon signal is also sent. However, in this embodiment, the second stage of signal transmission is improved, and the detailed illustration is as follows.

In step 101, amplitude modulation is respectively performed on n binary codes that represent the information to be transmitted, so as to obtain n coded amplitude modulation signals which are sequentially arranged.

Specifically, the stylus 100 firstly respectively performs amplitude modulation on n binary codes that represent the information to be transmitted, to obtain n coded amplitude modulation signals which are sequentially arranged. In a specific amplitude modulation mode, signal amplitude of a binary code of 1 is modulated into a first amplitude, a signal amplitude of a binary code of 0 is modulated into a second amplitude, and the first amplitude is greater than the second amplitude. Preferably, the second amplitude is 0, i.e., the signal amplitude of the binary code of 0 is modulated into 0. In this case, the stylus 100 does not send the coded amplitude modulation signal within a time slice of the binary code of 0. Such that a relatively simple processing mode for the signal that corresponds to the binary code of 0 is provided. Herein, a time slice of a binary code is a time slice of a coded amplitude modulation signal corresponding to the binary code and the time slice of a binary code refers to a sending time period allocated to the coded amplitude modulation signal corresponding to each binary code. In each sending time period, the stylus 100 sends the corresponding coded amplitude modulation signal in each sending time period. The information to be transmitted may be a nib pressure of the stylus 100 or a pressing signal of a functional key of the stylus 100. The nib pressure can be measured by a component similar to a pressure sensor and the like. The measured nib pressure is severed as the information to be transmitted. The information to be transmitted is coded and sent to the touch screen. The pressing signal of a functional key is also similarly processed, the functional key generates information to be transmitted corresponding to the function after being pressed (in the process, the information to be transmitted may be obtained by some signal processing), and then the information to be transmitted is coded and sent to the touch screen.

In step 102, the n coded amplitude modulation signals which are sequentially arranged are continuously transmitted. Here, the coded amplitude modulation signals, sequence numbers of which are odd, are transmitted at the preset first frequency, and the coded amplitude modulation signals, sequence numbers of which are even, are transmitted at the preset second frequency.

Specifically, two transmission frequencies, i.e., a first frequency f1 and a second frequency f2, are preset inside the stylus 100. The n coded amplitude modulation signals are continuously transmitted. The coded amplitude modulation signals, the sequence numbers of which are odd, are transmitted at the first frequency f1. And the coded amplitude modulation signals, the sequence numbers of which are even, are transmitted at the second frequency f2. In an example shown in FIG. 4, there are 8 coded amplitude modulation signals (i.e., 8 binary codes represent one piece of information to be transmitted), the stylus alternatively and continuously transmits the 8 coded amplitude modulation signals according to the arrangement sequence thereof at the first frequency f1 and the second frequency f2. As shown in the figure, the first, third, fifth and seventh coded amplitude modulation signal have the first frequency f1, and the second, fourth, sixth and eighth coded amplitude modulation signal have the second frequency f2. It should be noted that FIG. 4 only schematically gives out the number of the coded amplitude modulation signals, but this embodiment does not make any limitation to the specific number of the coded amplitude modulation signals.

In this embodiment, the first frequency and the second frequency may be integral multiple of a fundamental frequency, and a modulus of a difference value between the first frequency and the second frequency is greater than or equal to twice of the fundamental frequency. Herein the fundamental frequency is a reciprocal of a time slice length of the time slice of the coded amplitude modulation signal. Preferably, the time slice lengths of all of the coded amplitude modulation signals are equal, i.e., transmission duration of the coded amplitude modulation signal corresponding to each binary code is the same. For example, if the time slice length of each coded amplitude modulation signal is 100 us, the corresponding fundamental frequency is 10 KHz, and the first frequency and the second frequency are selected to be integral multiple of 10 KHz, e.g., the first frequency and the second frequency respectively are 20 KHz and 40 KHz. Herein by setting the modulus of the difference value between the first frequency and the second frequency to be greater than or equal to twice of the fundamental frequency, mutual affection between the first frequency and the second frequency can be avoided.

Here, by setting the time slice length of all of the coded amplitude modulation signals to be equal, the complexity of transmitting the coded amplitude modulation signals at a stylus can be simplified, and meanwhile, the complexity of detecting at a touch screen can also be simplified.

However, this embodiment does not make any limitation to setting the time slice length of each coded amplitude modulation signal. For example, the time slice lengths of all of the coded amplitude modulation signals that are sent at the same frequency can be set to be equal, and the time slice lengths of the coded amplitude modulation signals that are sent at different frequencies can be set to be unequal. Alternatively, the time slice lengths of all of the coded amplitude modulation signals can be set to be unequal or the time slice lengths of a plurality of coded amplitude modulation signals in the code amplitude modulation signals can be set to be equal. When the time slice lengths of all of the coded amplitude modulation signals are unequal, a reciprocal of a minimum time slice length is used as the fundamental frequency.

A second embodiment of the present disclosure relates to a signal receiving method which is applied to a touch screen. When a touch screen is in a stage of detecting signals of a stylus, the touch screen performs detection on the coded amplitude modulation signals that are transmitted by the stylus according to the signal transmitting method described in the first embodiment.

Figure 5:
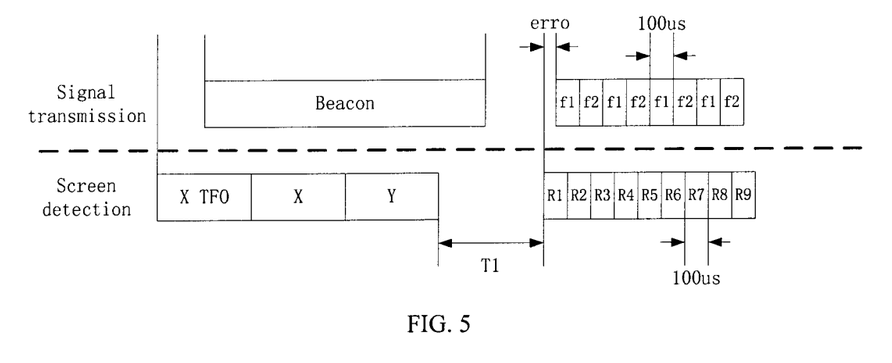
FIG. 5 is a schematic diagram of one example of signal transmission of a stylus and screen detection according to a second embodiment of the present disclosure.
Figure 6:
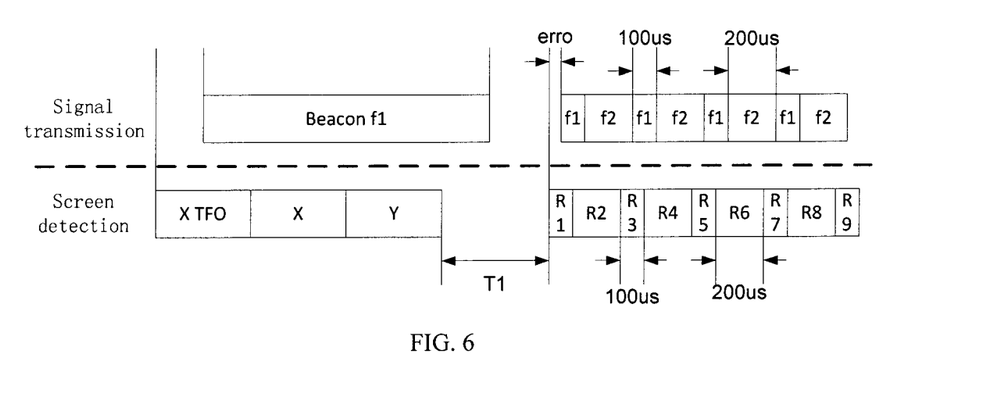
FIG. 6 is a schematic diagram of another example of signal transmission of the stylus and screen detection according to the second embodiment of the present disclosure.

With reference to FIG. 5 and FIG. 6, in the stage of detecting signals of a stylus, when a beacon signal is detected by the touch screen, the touch screen firstly completes detection of three time slices (X TFO/X/Y). The X TFO time slice is used for calculating adjustment time (et) of a synchronization error, the X/Y time slices are used for calculating a coordinate of a nib. The touch screen adjusts a time delay T1 according to the adjustment time (et) that is obtained by calculating, so as to adjust the start time of code detection, thereby making the synchronization error (erro) between the touch screen and the stylus within an allowable range and ensuring that the touch screen can detect out all of n binary codes that are continuously transmitted by the nib. Here, the synchronization error (erro) of code detection is desired to be controlled to be less than half of the minimum time slice length in the time slice lengths of all the coded amplitude modulation signals. For example, if the minimum time slice length is 100 us, the synchronization error (erro) of code detection is desired to be less than 50 us.

Figure 7:
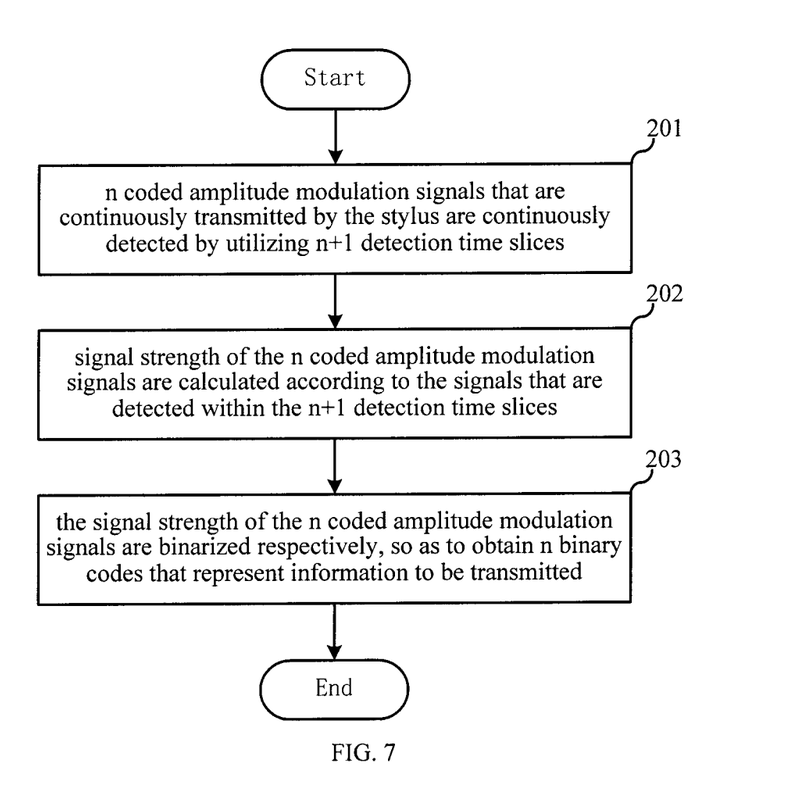
FIG. 7 is a specific flow chart of a signal receiving method according to the second embodiment of the present disclosure.

After the start time of code detection is determined, the signal receiving method of this embodiment is performed, with a specific flow shown in FIG. 7.

In step 201, n coded amplitude modulation signals that are continuously transmitted by the stylus are continuously detected by utilizing n+1 detection time slices.

Specifically, from the start time of code detection, the n coded amplitude modulation signals that are continuously transmitted by the stylus 100 are continuously detected by utilizing n+1 detection time slices. Here, in the n coded amplitude modulation signals that are transmitted by the stylus 100, the coded amplitude modulation signals, sequence numbers of which are odd, have a preset first frequency f1, and the coded amplitude modulation signals, sequence numbers of which are even, have a preset second frequency f2 which is different from the first frequency.

When the stylus 100 transmits the n coded amplitude modulation signals, there may be cases of transmission in advance and lagged transmission, and thus, in order to ensure that the touch screen completely receives each coded amplitude modulation signal, a receiving window corresponding to each coded amplitude modulation signal is desired to be greater than the time slice length of the coded amplitude modulation signal, and synchronization error (erro) time is desired to be reserved before and after the transmission. Therefore, two adjacent detection time slices are used as a detection window of one coded amplitude modulation signal; that is, it should be satisfied that: signals that are detected within an $i^{th}$ detection time slice and a $(i+1)^{th}$ detection time slice include a complete $i^{th}$ coded amplitude modulation signal, and i=1, 2, 3 . . . n. In other word, detection on the $i^{th}$ coded amplitude modulation signal is desired to be completed within two adjacent detection time slices (the $i^{th}$ detection time slice and the $(i+1)^{th}$ detection time slice).

Here, each detection time slice of screen detection is desired to satisfy the following conditions: a time slice length of the $i^{th}$ detection time slice is equal to that of the $i^{th}$ coded amplitude modulation signal, i=1, 2, 3 . . . n herein, and a time slice length of the $(n+1)^{th}$ detection time slice is equal to one of time slice lengths of the first n detection time slices. Preferably, the time slice length of the $(n+1)^{th}$ detection time slice is equal to a minimum time slice length in the time slice lengths of the first n detection time slices, so that detection time of the touch screen can be further saved.

In this embodiment, the stylus 100 alternatively and continuously transmits n coded amplitude modulation signals at the first frequency f1 and the second frequency f2 respectively, and during the screen detection, two adjacent coded amplitude modulation signals are simultaneously detected within the same (one single) detection time slice. Due to different transmission frequencies of two adjacent coded amplitude modulation signals, the touch screen can still distinguish two coded amplitude modulation signals within each detection time slice, so that the touch screen can accurately detect n coded amplitude modulation signals.

In one example, as shown in FIG. 5, the stylus 100 alternatively and continuously transmits 8 coded amplitude modulation signals at the first frequency f1 and the second frequency f2 respectively. The time slice lengths of the coded amplitude modulation signals of both the first frequency f1 and the second frequency f2 are equal and are 100 us, and then the synchronization error (erro) is half of the minimum time slice length in the time slice lengths of all the coded amplitude modulation signals and is 50 us. During the screen detection, continuous detection of 8 coded amplitude modulation signals is completed by utilizing 9 detection time slices (R1 to R9). The time slice length of the $i^{th}$ detection time slice is equal to that of the $i^{th}$ coded amplitude modulation signal and the time slice lengths of the coded amplitude modulation signals of both the first frequency f1 and the second frequency f2 are 100 us, thus, time slice lengths of the first 8 detection time slices are all 100 us. Since the time slice length of each coded amplitude modulation signal is 100 us, the time slice length of the ninth detection time slice is equal to that of each coded amplitude modulation signal and is 100 us.

In another example, as shown in FIG. 6, the stylus 100 alternatively and continuously transmits 8 coded amplitude modulation signals at the first frequency f1 and the second frequency f2 respectively. The time slice lengths of the coded amplitude modulation signals of the first frequency f1 are all equal and are 100 us. The time slice lengths of the coded amplitude modulation signals of the second frequency f2 are all equal and are 200 us. The synchronization error is half of the minimum time slice length in the time slice lengths of all the coded amplitude modulation signals and is 50 us. During the screen detection, continuous detection of 8 coded amplitude modulation signals is completed by utilizing 9 detection time slices (R1 to R9). The time slice length of the $i^{th}$ detection time slice is equal to that of the $i^{th}$ coded amplitude modulation signal, and thus, time slice lengths of the detection time slices R1, R3, R5 and R7 are all 100 us, and time slice lengths of the detection time slices R2, R4, R6 and R8 are all 200 us. The time slice length of the $(n+1)^{th}$ detection time slice is equal to one of the time slice lengths of the first n detection time slices, i.e., a time slice length of the detection time slice R9 may be 100 us or 200 us. Preferably, the time slice length of the detection time slice R9 is 100 us (which is taken as an example in the figure).

It should be noted that in FIG. 5, an example is given to illustrate that the time slice lengths of all of the coded amplitude modulation signals are equal, and in FIG. 6, an example is provided to illustrate that the time slice lengths of the coded amplitude modulation signals with the same frequencies are all equal and the time slice lengths of the coded amplitude modulation signals with different frequencies are unequal. However, the present disclosure is not limited thereto, alternatively, the time slice lengths of all of the coded amplitude modulation signals may be unequal or the time slice lengths of a plurality of the coded amplitude modulation signals in the coded amplitude modulation signals may be equal, as long as each detection time slice meets the above-mentioned condition.

In step 202, signal strength of the n coded amplitude modulation signals are calculated according to the signals that are detected within the n+1 detection time slices.

Specifically, detection on the $i^{th}$ coded amplitude modulation signal is completed within the $i^{th}$ detection time slice and the $(i+1)^{th}$ detection time slice, and thus, signal strength of the $i^{th}$ coded amplitude modulation signal is desired to be calculated according to the $i^{th}$ detection time slice and the $(i+1)^{th}$ detection time slice. Signal strength Biti of the $i^{th}$ coded amplitude modulation signal is that:

When i is an odd number, $Bit_i = R_i\_f1 + R_{i+1}\_f1$; and
When i is an even number, $Bit_i = R_i\_f2 + R_{i+1}\_f2$, Here, $R_i\_f1$ represents the signal strength of the coded amplitude modulation signal with the first frequency within the $i^{th}$ detection time slice, $R_i\_f2$ represents the signal strength of the coded amplitude modulation signal with the second frequency within the $i^{th}$ detection time slice, $R_{i+1}\_f1$ represents the signal strength of the coded amplitude modulation signal with the first frequency within the $(i+1)^{th}$ detection time slice, and $R_{i+1}\_f2$ represents the signal strength of the coded amplitude modulation signal with the second frequency within the $(i+1)^{th}$ detection time slice. Specific illustration will be carried out below with reference to FIG. 5 or FIG. 6.

Signal strength Bit1 of a first coded amplitude modulation signal is that: $Bit1 = R1\_f1 + R2\_f1$;

Signal strength Bit2 of a second coded amplitude modulation signal is that: $Bit2 = R2\_f2 + R3\_f2$;

Signal strength Bit3 of a third coded amplitude modulation signal is that: $Bit3 = R3\_f1 + R4\_f1$;

Signal strength Bit4 of a fourth coded amplitude modulation signal is that: $Bit4 = R4\_f2 + R5\_f2$;

Signal strength Bit5 of a fifth coded amplitude modulation signal is that: $Bit5 = R5\_f1 + R6\_f1$;

Signal strength Bit6 of a sixth coded amplitude modulation signal is that: $Bit6 = R6\_f2 + R7\_f2$;

Signal strength Bit7 of a seventh coded amplitude modulation signal is that: $Bit7 = R7\_f1 + R8\_f1$; and Signal strength Bit8 of an eighth coded amplitude modulation signal is that: $Bit8 = R8\_f2 + R9\_f2$.

In step 203, the signal strength of the n coded amplitude modulation signals are binarized respectively, so as to obtain n binary codes that represent information to be transmitted.

Specifically, a first threshold and a second threshold are preset inside the touch screen, and the first threshold is greater than the second threshold. The touch screen compares the signal strength of the n coded amplitude modulation signals, which are obtained by calculating, with the first threshold and the second threshold. In the n coded amplitude modulation signals, binary codes of the coded amplitude modulation signals, the signal strength of which are greater than the first threshold, are 1, and binary codes of the coded amplitude modulation signals, the signal strength of which are greater than the second threshold, are 0, so that n binary codes that represent information to be transmitted, which are transmitted by the stylus 100, can be obtained.

Compared to the existing technology, in this embodiment, the stylus respectively performs amplitude modulation on n binary codes that represent the information to be transmitted and transmits the n coded amplitude modulation signals continuously and alternatively at the first frequency and the second frequency, so that fault-tolerant time between coded amplitude modulation signals is saved, transmission time of the same number of coded amplitude modulation signals is reduced, and correspondingly, time required by the touch screen for completing detection on the coded amplitude modulation signals is reduced, thereby promoting a report rate and improving the anti-interference ability of the touch screen. Meanwhile, when the touch screen detects all of the coded amplitude modulation signals continuously transmitted, one complete coded amplitude modulation signal can still be acquired and distinguished within two adjacent detection time slices, and thus, detection is still accurate.

A third embodiment of the present disclosure relates to a stylus. The stylus includes at least one processor, and a storage in communication connection with the at least one processor. The storage stores instructions which can be executed by the at least one processor, and the instructions are executed by the at least one processor, so that the at least one processor can implement the signal transmitting method described in the first embodiment.

Compared to the existing technology, in this embodiment, the stylus respectively performs amplitude modulation on n binary codes that represent information to be transmitted and transmits the n coded amplitude modulation signals continuously and alternatively at a first frequency and a second frequency, so that fault-tolerant time between coded amplitude modulation signals is saved, transmission time of the same number of coded amplitude modulation signals is reduced, and correspondingly, time required by a screen end for completing detection on the coded amplitude modulation signals is reduced, thereby promoting a report rate and improving the anti-interference ability of a touch screen. Meanwhile, when the touch screen detects all of the coded amplitude modulation signals that are continuously transmitted, one complete coded amplitude modulation signal can still be acquired and distinguished within two adjacent detection time slices, and thus, detection is still accurate.

A fourth embodiment of the present disclosure relates a touch screen. The touch screen includes at least one processor, and a storage in communication connection with the at least one processor. The storage stores instructions which can be executed by the at least one processor, and the instructions are executed by the at least one processor, so that the at least one processor can implement the signal receiving method described in the second embodiment.

Compared to the existing technology, in this embodiment, the stylus respectively performs amplitude modulation on n binary codes that represent information to be transmitted and transmits the n coded amplitude modulation signals continuously and alternatively at a first frequency and a second frequency, so that fault-tolerant time between coded amplitude modulation signals is saved, transmission time of the same number of coded amplitude modulation signals is reduced, and correspondingly, time required by a screen end for completing detection on the coded amplitude modulation signals is reduced, thereby promoting a report rate and improving the anti-interference ability of the touch screen. Meanwhile, when the touch screen detects all of the coded amplitude modulation signals that are continuously transmitted, one complete coded amplitude modulation signal can still be acquired and distinguished within two adjacent detection time slices, and thus, detection is still accurate.

Those ordinary skilled in the art may understand that each of the above-mentioned embodiments is the specific embodiment for implementing the present disclosure, however in the practical application, various changes may be made to the embodiments in form and in detail, without departing from the spirit and scope of the present disclosure.

What is claimed is:

1. A signal transmitting method, applied to a stylus, and comprising:
   performing amplitude modulation respectively on n binary codes that represent information to be transmitted, so as to obtain n coded amplitude modulation signals which are sequentially arranged, wherein n is an integer greater than 1; and
   continuously transmitting the n coded amplitude modulation signals which are sequentially arranged, wherein the coded amplitude modulation signals, sequence numbers of which are odd, are transmitted at a preset first frequency, and the coded amplitude modulation signals, sequence numbers of which are even, are transmitted at a preset second frequency.

2. The signal transmitting method according to claim 1, wherein both the first frequency and the second frequency are integral multiple of a fundamental frequency, and a modulus of a difference value between the first frequency and the second frequency is greater than or equal to twice of the fundamental frequency.

3. The signal transmitting method according to claim 1, wherein time slice lengths of all of the coded amplitude modulation signals are equal.

4. The signal transmitting method according to claim 1, wherein when the binary code is 0, the coded amplitude modulation signal is 0.

5. The signal transmitting method according to claim 1, wherein the information to be transmitted comprises a nib pressure of the stylus or a pressing signal of a functional key of the stylus.

6. A signal receiving method, applied to a touch screen, and comprising:
   continuously detecting n coded amplitude modulation signals which are continuously transmitted by a stylus, by utilizing n+1 detection time slices; wherein in the n coded amplitude modulation signals, the coded amplitude modulation signals, sequence numbers of which are odd, have a preset first frequency, the coded amplitude modulation signals, sequence numbers of which are even, have a preset second frequency, signals that are detected within an $i^{th}$ detection time slice and a $(i+1)^{th}$ detection time slice, comprise a complete $i^{th}$ coded amplitude modulation signal, and i=1, 2, 3 ... n;
   calculating signal strength of the n coded amplitude modulation signals according to the signals that are detected within the n+1 detection time slices; and
   binarizing the signal strength of the n coded amplitude modulation signals respectively, so as to obtain n binary codes that represent information to be transmitted.

7. The signal receiving method according to claim 6, wherein a time slice length of the $i^{th}$ detection time slice is equal to that of an $i^{th}$ coded amplitude modulation signal, and a time slice length of a $(n+1)^{th}$ detection time slice is equal to one of time slice lengths of the first n detection time slices.

8. The signal receiving method according to claim 7, wherein the time slice length of the $(n+1)^{th}$ detection time slice is equal to a minimum time slice length in the time slice lengths of the first n detection time slices.

9. The signal receiving method according to claim 6, wherein the time slice lengths of all of the coded amplitude modulation signals are equal.

10. The signal receiving method according to claim 7, wherein the time slice lengths of all of the coded amplitude modulation signals are equal.

11. The signal receiving method according to claim 8, wherein the time slice lengths of all of the coded amplitude modulation signals are equal.

12. The signal receiving method according to claim 6, wherein signal strength Biti of the $i^{th}$ coded amplitude modulation signal is that:
   when i is an odd number, Biti=Ri_f1+Ri+1_f1; and
   when i is an even number, Biti=Ri_f2+Ri+1_f2, wherein Ri_f1 represents the signal strength of the coded amplitude modulation signal with the first frequency within the $i^{th}$ detection time slice, Ri_f2 represents the signal strength of the coded amplitude modulation signal with the second frequency within the $i^{th}$ detection time slice, Ri+1_f1 represents the signal strength of the coded amplitude modulation signal with the first frequency within the $(i+1)^{t}$ detection time slice, and Ri+1_f2 represents the signal strength of the coded amplitude modulation signal with the second frequency within the $(i+1)^{th}$ detection time slice.

13. A touch screen, comprising:
   at least one processor; and
   a storage in communication connection with the at least one processor,
wherein the storage stores instructions which can be executed by the at least one processor, and the instructions are executed by the at least one processor, so that the at least one processor implements a signal receiving method, being applied to a touch screen and comprising:
   continuously detecting n coded amplitude modulation signals which are continuously transmitted by a stylus, by utilizing n+1 detection time slices; wherein in the n coded amplitude modulation signals, the coded amplitude modulation signals, sequence numbers of which are odd, have a preset first frequency, the coded amplitude modulation signals, sequence numbers of which are even, have a preset second frequency, signals that are detected within an $i^{th}$ detection time slice and a $(i+1)^{th}$ detection time slice, comprise a complete $i^{th}$ coded amplitude modulation signal, and i=1, 2, 3 ... n;
   calculating signal strength of the n coded amplitude modulation signals according to the signals that are detected within the n+1 detection time slices; and binarizing the signal strength of the n coded amplitude modulation signals respectively, so as to obtain n binary codes that represent information to be transmitted.

\* \* \* \* \*